(12) United States Patent
De Roche

(10) Patent No.: US 6,429,810 B1
(45) Date of Patent: Aug. 6, 2002

(54) INTEGRATED AIR LOGISTICS SYSTEM

(76) Inventor: Mark Stephen De Roche, 656 Porter La., Hermosa Beach, CA (US) 90254

( * ) Notice: Subject to any disclaimer, the term of this patent is extended or adjusted under 35 U.S.C. 154(b) by 0 days.

(21) Appl. No.: 09/774,547

(22) Filed: Jan. 31, 2001

Related U.S. Application Data

(60) Provisional application No. 60/179,536, filed on Feb. 1, 2000, provisional application No. 60/228,100, filed on Aug. 28, 2000, and provisional application No. 60/242,355, filed on Oct. 23, 2000.

(51) Int. Cl.[7] .............................. G01S 5/02; H04B 7/185
(52) U.S. Cl. ........................ 342/357.07; 342/357.06
(58) Field of Search ...................... 342/357.01, 357.06, 342/357.07, 357.13, 450, 457

(56) References Cited

U.S. PATENT DOCUMENTS

| | | | | |
|---|---|---|---|---|
| 5,588,005 A | * | 12/1996 | Ali et al. ..................... 370/346 |
| 5,686,888 A | * | 11/1997 | Welles, II et al. ........... 340/539 |
| 5,691,980 A | * | 11/1997 | Welles, II et al. ........... 370/316 |
| 5,751,245 A | * | 5/1998 | Janky et al. ................. 342/357 |
| 6,246,882 B1 | * | 6/2001 | Lachance .................... 455/456 |

* cited by examiner

*Primary Examiner*—Dao Phan
(74) *Attorney, Agent, or Firm*—McCutchen Doyle Brown & Enersen LLP; David G. Beck

(57) ABSTRACT

An autonomous cargo tracking system and method of using same are provided. The system is comprised of communication and sensor unit that is affixed to the container to be tracked, a ground system that coordinates communications between the unit and the users, and one or more satellite systems that provide communication capabilities as well as position information. The system can operate either as a unidirectional system or as a bi-directional system. As a unidirectional system data is sent either directly to the users or, more preferably, sent indirectly to the users via the ground system. As a bi-directional system users are able to both request and receive data from the unit, either directly or indirectly through the ground system. Preferably users communicate with the ground system using an Internet Web site.

50 Claims, 9 Drawing Sheets

INTEGRATED AIR LOGISTICS SYSTEM

CROSS-REFERENCES TO RELATED APPLICATIONS

This application claims priority of Provisional Patent Application Serial Nos. 60/179,536 filed Feb. 1, 2000; Ser. No. 60/228,100, filed Aug. 28, 2000; and Ser. No. 60/242,355, filed Oct. 23, 2000, the disclosures of which are incorporated herein by reference for all purposes.

FIELD OF THE INVENTION

The present invention relates generally to freight shipping and, more particularly, to a method and apparatus for tracking air cargo.

BACKGROUND OF THE INVENTION

Freight or cargo is shipped using any of a variety of methods, the method or methods used for any one shipment being selected on the basis of cost, delivery schedule, and pick-up and drop-off locations. Furthermore, if the goods are perishable or fragile, additional shipping precautions may be required.

During shipment, it is extremely difficult and typically very labor intensive to determine the exact location of the goods being shipped. Such tracking often requires multiple communications via phone, fax, e-mail, or other means between the shipper, forwarder, and the various carrier personnel. Location determination may even require physically searching a cargo storing warehouse, trucking warehouse, airport cargo terminal, or other location.

Shipment tracking is complicated by a number of factors. First, a variety of parties typically handle a piece of cargo during shipping, the parties potentially working for multiple independent companies. For example, a single shipment may require handling by multiple trucks and/or trucking companies and utilize multiple airline flights and/or airline companies. Additionally, a variety of cargo handlers/loaders are required to move the cargo between trucks/flights/carriers, staging areas, and temporary storage locations. Second, there are often last minute changes in shipping, for example due to a piece of freight being off-loaded from a scheduled flight in order to make room for a more valuable or time sensitive piece of freight. Such changes are typically made at the discretion of the carrier without notifying either the shipper or the forwarder. In this situation the shipper or forwarder may not be aware of the change until the freight does not arrive on the scheduled flight or at the expected time. As a result, the shipper is likely to expend additional time attempting to locate the delayed freight.

A number of carriers have attempted to provide improved tracking information by allowing at least some of the larger forwarders to directly view their loading manifests, for example via a Web site. Although this approach can provide some tracking information, it requires carriers to accurately update the status of cargo at each step of cargo movement. As a consequence, this approach is labor intensive and thus costly. Additionally, the cargo status may not be updated at each step, for example, the carrier may only update the status when the cargo actually is loaded or unloaded from a plane, not when the cargo is simply moved from a storage facility to a loading site. Lastly, as cargo status information relies on human operators inputting the data, the data may be incorrect or delayed.

Some shipping integrators have begun to use bar code tracking as a means of providing cargo tracking. Typically each piece of cargo is immediately tagged with a bar code upon receipt by the integrator. Then at each step of shipping, the handler scans the bar code, thereby immediately logging the location of the cargo as well as the time that the bar code was scanned into a manifest readable by the shipper via a Web site or other means. Although this approach reduces the risk of human error through the use of bar codes, the approach is still labor intensive as human operators are required to input the data. Additionally, the provided information is still only as accurate as the last bar code scan.

Accordingly, what is needed in the art is a system that autonomously tracks cargo during shipping, providing the shipper and/or forwarder with accurate, timely, cargo status. The present invention provides such a system.

SUMMARY OF THE INVENTION

An autonomous cargo tracking system and method of using same are provided. The system is comprised of a communication and sensor unit that is affixed to the container to be tracked, a ground system that coordinates communications between the unit and the users, and one or more satellite systems that provide communication capabilities as well as position information. The system can operate either as a unidirectional system or as a bi-directional system. As a unidirectional system data is sent either directly to the users or, more preferably, sent indirectly to the users via the ground system. As a bi-directional system users are able to both request and receive data from the unit, either directly or indirectly through the ground system. Preferably users communicate with the ground system using an Internet Web site.

According to the invention, a position sensing and communication (PSC) unit is affixed to or integrated into a shipping container, shipping pallet, cargo net, or cargo unit load device (ULD). The PSC unit provides a means of communicating with a ground system and determining location coordinates. Additionally, the PSC unit can include one or more sensor modules that can be used to provide additional information such as environmental conditions, container status, rate and/or direction of movement, etc. Once activated, the identity of a specific PSC unit is linked to or associated with the specific cargo to which it is coupled.

The PSC unit, using a GPS satellite constellation or other means, obtains position coordinates in response to a triggering event, the type of triggering event depending upon the configuration of the PSC unit and/or the system. Triggering events include detected movement, detected movement meeting preset criteria, a change in a predefined environmental condition (e.g., humidity, vibrational level, pressure, temperature, etc.), lapsing of a preset time period, and/or when polled by the ground system or a user.

In the preferred embodiment position coordinates, once determined, are sent to a ground system for translation into user recognizable locations, the translated coordinates provided either textually (i.e., as a location description) or graphically (i.e., as a map with a location indicator). The ground system sends the location information to a user, either in response to a request for the information by the user or automatically according to a predefined set of rules.

Preferably the communication portions of the PSC unit are placed in standby mode when the container and the associated PSC unit are loaded into the cargo bay of an aircraft, thus insuring that the unit does not interfere with the aircraft's avionics systems. In one embodiment, container loading is determined on the basis of the container being raised more than five feet, as determined by an on-board accelerator module, and at a rate commensurate with a cargo loader. Preferably container loading is verified, for example by comparing the container's coordinates with an airport data base. In an alternate embodiment, container loading is determined by monitoring the electromagnetic spectrum of its surroundings, specifically monitoring for the radiated emissions of the aircraft power supply which are most prevalent at 400 Hertz. In another alternate embodiment, the PSC unit includes a RF detector designed to detect non-aircraft originating RF signals, the receipt of which is interrupted when the container and PSC unit are loaded into the aircraft. In yet another alternate embodiment, the PSC unit's sensor module emits one or more pulses of radiation, preferably ultrasonic radiation, and monitors the return of the radiation. The timing of the return can be used to detect the proximity of adjacent surfaces, such as the walls of the aircraft.

A further understanding of the nature and advantages of the present invention may be realized by reference to the remaining portions of the specification and the drawings.

DESCRIPTION OF THE SPECIFIC EMBODIMENTS

Figure 1:
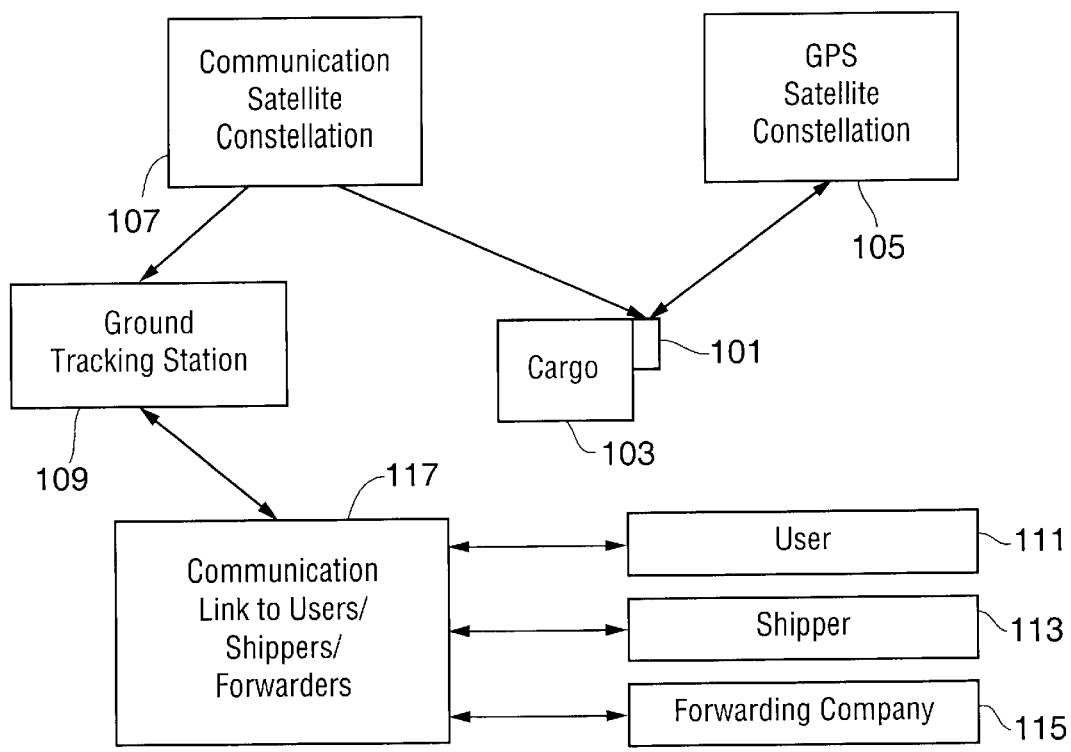
FIG. 1 is an illustration of a cargo tracking system in accordance with the invention.

FIG. 1 is an illustration of a cargo tracking system in accordance with the invention. As shown, a battery powered position sensing and communication (PSC) unit 101 is coupled to a shipping container 103. Unit 101 is capable of locating its position utilizing a global positioning system or GPS that is comprised, in part, of a GPS satellite constellation 105. A satellite communication constellation 107 links unit 101 to a ground receiver station 109. It is understood that satellite constellations 105 and 107 may be comprised of a single satellite constellation serving dual purposes, or multiple independent satellite constellations. An end user 111, a shipper 113, a forwarding company 115, or other designated party (not shown) obtains cargo status from ground station 109 via communication link 117. Preferably communication link 117 is a Web site although other communication links may be used.

Figure 2:
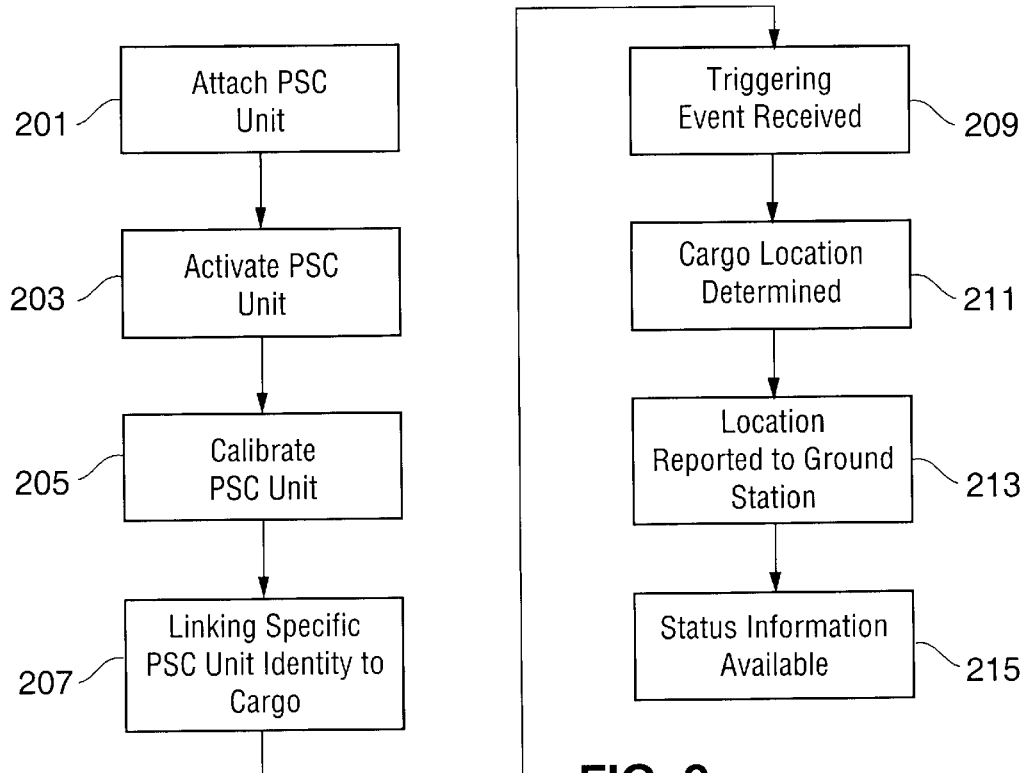
FIG. 2 is an illustration of one method of using the invention.

FIG. 2 provides further detail by illustrating one method of using the invention. As shown, initially a PSC unit is attached to a cargo container or other freight to be tracked. (Step 201) Preferably at this time the PSC unit is activated (step 203), calibrated if necessary (step 205), and its identity linked to the cargo in question (step 207). Once activated, each time the PSC unit receives a triggering event (step 209), it queries the GPS satellite constellation to determine its current location (step 211). A variety of triggering events can be used, depending upon the desired system configuration. For example, the PSC unit can be designed to periodically request position information, the period typically being on the order of minutes or hours. Alternately, the PSC unit can wait for the occurrence of a triggering event such as movement sensed in one or more directions, vibration exceeding a preset level, a change in pressure, a change in temperature, or other event.

After the PSC unit determines its location (step 211), it reports its location (step 213) to the ground station via the communication satellite constellation. This information can be reported each time the unit determines its location, only upon a registered change in location, at specific time intervals, or based on another identified triggering event. Once received by the ground station, updated status information is made available to the user, shipper, and/or forwarding party (step 215).

As is clear from the above disclosed methodology, once the PSC unit is attached and activated, cargo tracking can be performed without the intervention of human operators. Additionally, as the location can be determined and immediately reported whenever the cargo is moved, the shipper is assured of obtaining current location information.

Figure 3:
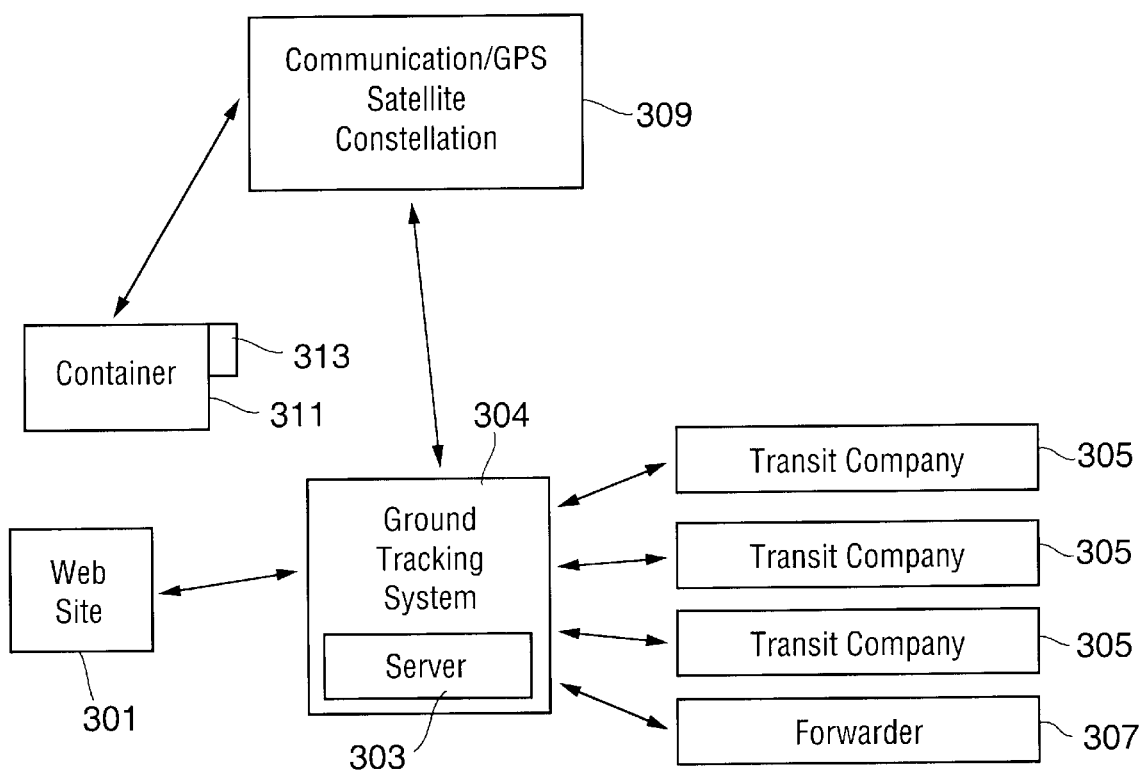
FIG. 3 is an illustration of a specific embodiment of the invention.
Figure 4:
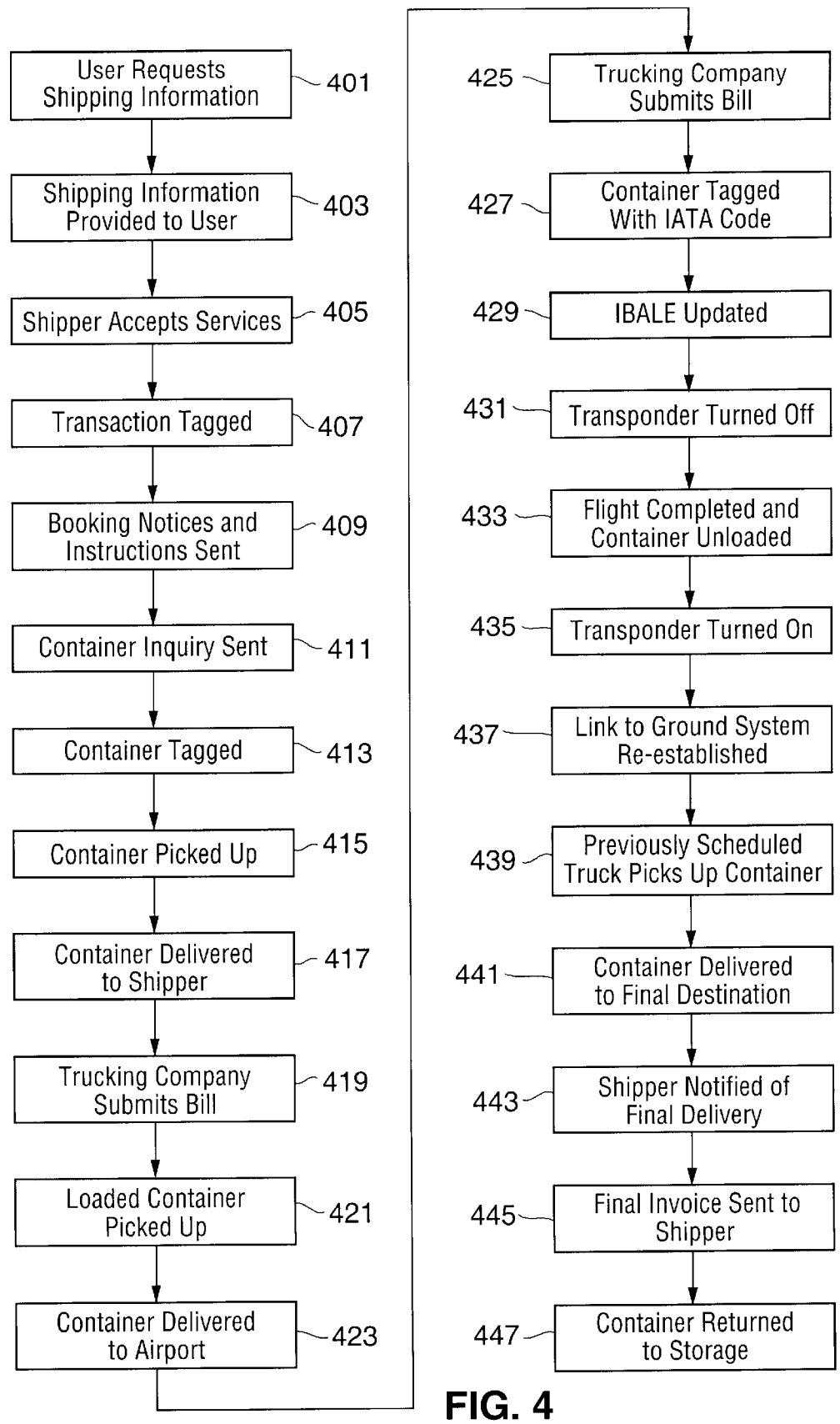
FIG. 4 is an illustration of the method of using the embodiment shown in FIG. 3.

FIGS. 3 and 4 illustrates a specific scenario utilizing one embodiment of the invention. This scenario is only meant to illustrate how the invention can be used; it is not meant to limit the invention as it will be apparent to those of skill that the present invention can utilize many variations. Further descriptions of other embodiments of the invention are provided below.

Typically the first step of using the present invention occurs when a shipper, via a Web site 301, requests shipping information. (Step 401) The requested shipping information will typically include price, shipping availability, and shipping schedule. A server 303 coupled to a ground tracking system 304 interacts with the shipper via Web site 301. Server 303, utilizing an internet based air logistics engine (IBALE), obtains the necessary shipper information such as the weight, volume and quantities of the intended cargo, any special requirements of the cargo (e.g., temperature, vibration, or pressure constraints), and the desired shipping schedule. Based on this information the IBALE system, preferably operating automatically without the use of human operators, provides the shipper with all of the requested information, including schedules and transit requirements (e.g., truck, train, ship, and/or airline). (Step 403) The IBALE system can be configured to provide the user with multiple shipping options, preferably prioritized on the basis of cost, schedule, or other shipping characteristic. Alternately, the IBALE system can be configured to provide a single shipping option based on the specific budgetary and schedule constraints input by the shipper.

Once the shipper agrees to the services (step 405), the transaction is tagged with a transaction identification code (step 407). Booking notices and shipping instructions are then sent out, preferably automatically, by ground system 304 to each of the required transit companies 305 (e.g., truck, train, ship, and/or airline) as well as any forwarders 307 that are required to intervene during shipping. (Step 409). Booking notices are preferably sent via e-mail, although other methods such as automated faxes can be used.

Ground system 304 then sends an inquiry (step 411), preferably via communication satellite constellation 309, to a container depot where PSC mounted containers are stored. Alternately, the status of the containers at the container depot can be routinely updated and the information provided via e-mail or an alternate method to the IBALE system for immediate access. Alternately, system 304 can inquire about the status of the containers via e-mail.

Once a suitably sized container 311/PSC unit 313 has been located which is neither tagged nor in use, the container is remotely tagged with the transaction identification code and, if required, a separate shipping identification code. (Step 413) A trucking company, under the direction of system 304, is directed to pick-up the identified container (step 415) and deliver it to the shipper (step 417). The shipper can track the impending arrival of the container via tracking system 304 and Web site 301 utilizing the tracking identification code. Alternately an e-mail notification can be automatically sent to the shipper by system 304 prior to the delivery of the container. If an automatic e-mail notification is sent, the shipper can still determine the exact location of the container, and thus an accurate delivery time, using the tracking identification code. Providing the shipper with an accurate container delivery schedule allows the shipper to best allocate resources for packing the container with the intended cargo. Once container 311 is delivered (step 417), the trucking company submits its bill (step 419), preferably submitting the bill via the IBALE website 301.

A second truck, from the same or different trucking company, picks up container 311 from the shipper at the time previously scheduled by IBALE. (Step 421) If the shipper requests any additional services from the trucking company that were not part of the original IBALE transaction, the additional charges are added to the second truckers invoice, referencing the shipper's transaction identification code. An example of an unscheduled service is the immediate generation of an air-way bill for the shipper, thus saving the shipper time. After container 311 is delivered (step 423) to the next transit site, typically an airport, the trucking company submits its bill (step 425), preferably submitting the bill via the IBALE website 301.

Depending upon the exact configuration of PSC unit 313, the shipper may be able to obtain additional information regarding container 311 besides its location. For example, PSC unit 313 can include a sensor that determines whether the container door is in an opened or closed position. If such a sensor is included in unit 313, the shipper can determine if the door is secure while the container is still in route between the shipper's loading site and the transit site by querying the sensor via IBALE web site 301. If the sensor indicates that the door is open, the shipper can contact the trucking company so that the individual truck can be contacted, stopped, and the door secured. It is understood that the door sensor is only given as an example of the additional sensors that can be used in conjunction with PSC unit 313 to provide the shipper with additional container/cargo information.

Assuming that the next transit site is an airport, once container 311 is delivered to the cargo terminal it is weighed and tagged with a standard LATA bar code specifying weight, destination, and aircraft. (Step 427) An air-way bill is either generated, including this information, or the information is added to an existing air-way bill that was previously generated by the trucking company. Additionally this information is reported back to system 304. (Step 429)

During air transit, the transponder within PSC unit 313 is automatically turned off, thus insuring that there is no interference with the aircraft's avionics systems. (Step 431) Upon flight completion container 311 is unloaded (step 433), causing the transponder to turn on (step 435) and for a link to be re-established via communication satellite constellation 309 to ground system 304 (step 437).

Upon unloading, container 311 is released to a truck that has been previously notified of the delivery schedule by ground system 304. (Step 439) The trucking company can be notified by e-mail, automated fax, or other means. If the container had been delayed, for example due to an unscheduled stopover, system 304 would have notified the trucking company of the delay. The trucking company delivers the container to the final destination. (Step 441) If additional services are required of the trucking company, beyond those accounted for in the original IBALE transaction, the additional charges are added to the trucking company's invoice, referencing the shipper's transaction identification code, and submitted via IBALE website 301.

After final delivery, a message is sent to the shipper, preferably via automated e-mail from system 304, notifying the shipper that the cargo goods have been delivered safely to the final destination. (Step 443) A final invoice is also sent to the shipper via e-mail, automated fax, alternate means, or some combination thereof. (Step 445) The final invoice includes the originally agreed upon shipping costs, additional charges that may have been incurred during shipping, and any applicable IBALE associated surcharges. Surcharges may, for example, be incurred for each IBALE inquiry made by the shipper, for each IBALE inquiry made by the shipper that exceeds a pre-allowed number of inquiries, or based on some other revenue-generating model. The now empty container is placed at the nearest storage depot or returned to the original storage depot. (Step 447) During storage the container is preferably located such that system 304 via the communication satellite network 309 can communicate with it, accessing its availability and location.

As previously noted, the present invention allows the shipper or other validated user to obtain accurate location information at any time via a Web site. Depending upon the configuration of the PSC unit, other real-time information may also be readily available to the user. In addition to being available for user retrieval, this information can be used to perform automated functions. For example, if PSC unit 313 includes a temperature sensor and the shipper has noted that the cargo is not to be exposed to temperatures below a certain temperature, PSC unit 313 can be configured to transmit a message to ground system 304 when the temperature falls below a preset temperature. Such a temperature drop could be experienced, for example, if container 311 were left outside in a loading zone at the airport terminal. Once such a message is received, ground system 304 would automatically contact the responsible party (e.g., airline, trucking company, cargo handler, etc.) via e-mail, automated fax, pre-recorded message delivery, voice synthesized message delivery, or other means, recommending that container 311 be moved to an area providing warmer temperatures. If desired, the system can also be configured to notify the shipper whenever container 311 is moved due to a triggering event, such as the temperature falling below a preset limit.

As described above, and as described in further detail below, the present invention can provide the shipper, forwarding party, or other involved party with information via either of two modes. First, a party is able to obtain information from the system by querying the system, assuming suitable party validation steps are taken to insure transaction information confidentiality. Second, the system itself can initiate communication with a party, typically in response to the occurrence of a triggering event. Triggering events can include changes in container location and/or the occurrence of a preset condition (e.g., temperature range exceeded, humidity range exceeded, vibration limit exceeded, container door open, etc.).

Figure 5:
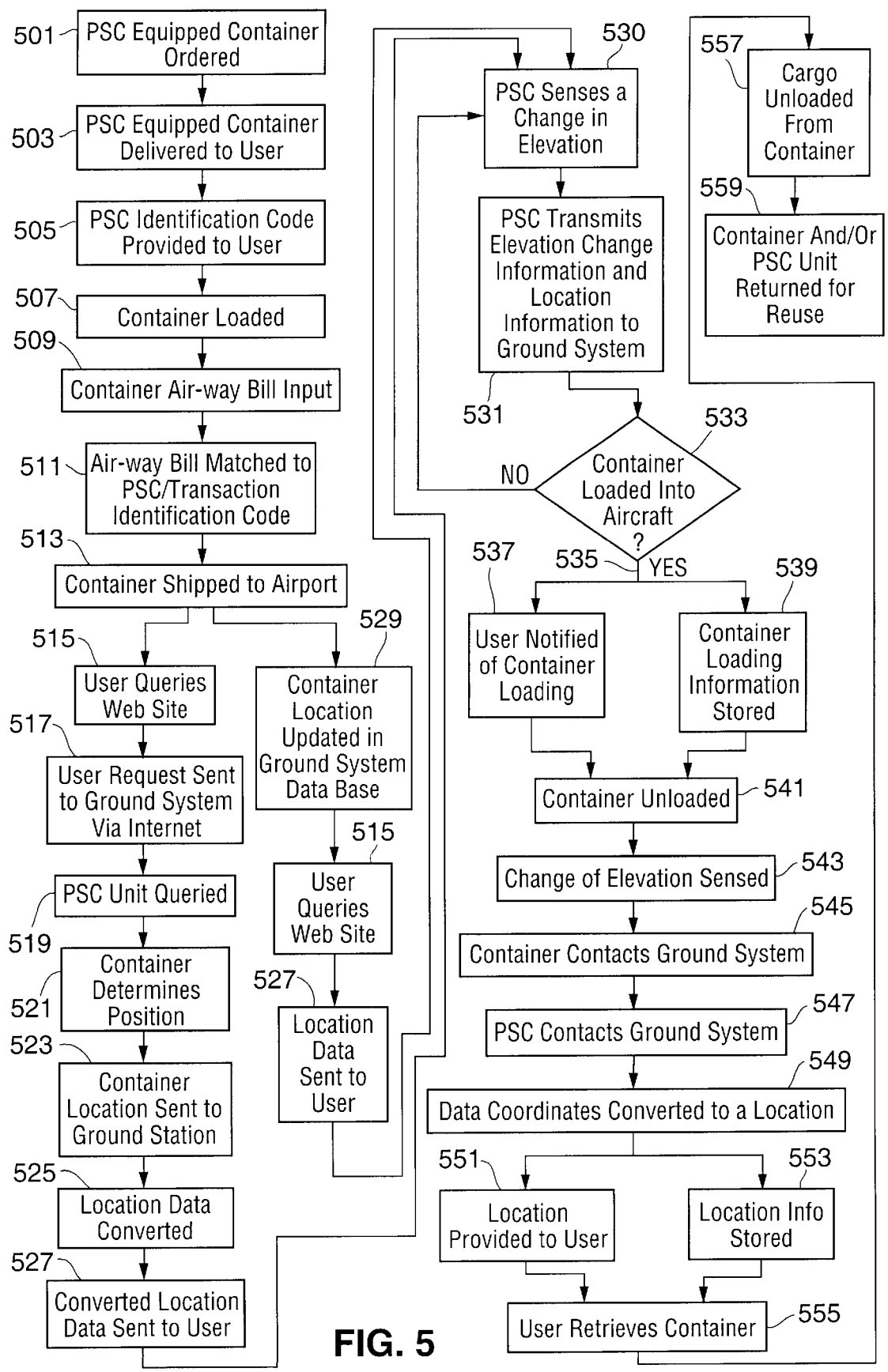
FIG. 5 illustrates the principal steps of the invention, assuming an embodiment in which an aircraft is used as the primary form of cargo transportation.

FIG. 5 illustrates the principal steps of the invention, assuming an embodiment in which an aircraft is used as the primary form of cargo transportation. Initially, a PSC unit equipped container is ordered. (Step 501) The ordering party, hereafter in this illustration referred to as the user, can be the shipper or the forwarding party (i.e., the carrier). Preferably the user orders a container that has been previously equipped with a PSC unit. Alternately, and as described in further detail below, the user can order a PSC unit for attachment to an existing user container. Alternately, the user can have a number of PSC units or PSC unit equipped containers on hand, and therefore would only have to contact the ground system (e.g., system 109 of FIG. 1 or system 304 of FIG. 3) to activate the PSC unit in question.

The PSC equipped container (or a PSC unit for attachment to an existing container) is delivered to the user (step 503) along with an identification code uniquely identifying the particular PSC unit (step 505). Preferably the PSC identification code is changed for each user transaction. Alternately, the PSC identification code can be permanently associated with a particular PSC unit, while an additional transaction code is used to associate the PSC unit with a particular user transaction. It is understood by those of skill in the art that other techniques exist that can provide a unique code for a specific transaction/PSC unit.

After the container is loaded with the intended cargo (step 507), the user inputs an air-way bill into the system (step 509), preferably through a Web site as previously described. The system then matches the air-way bill to the PSC/transaction identification code. (Step 511)

Figure 6:
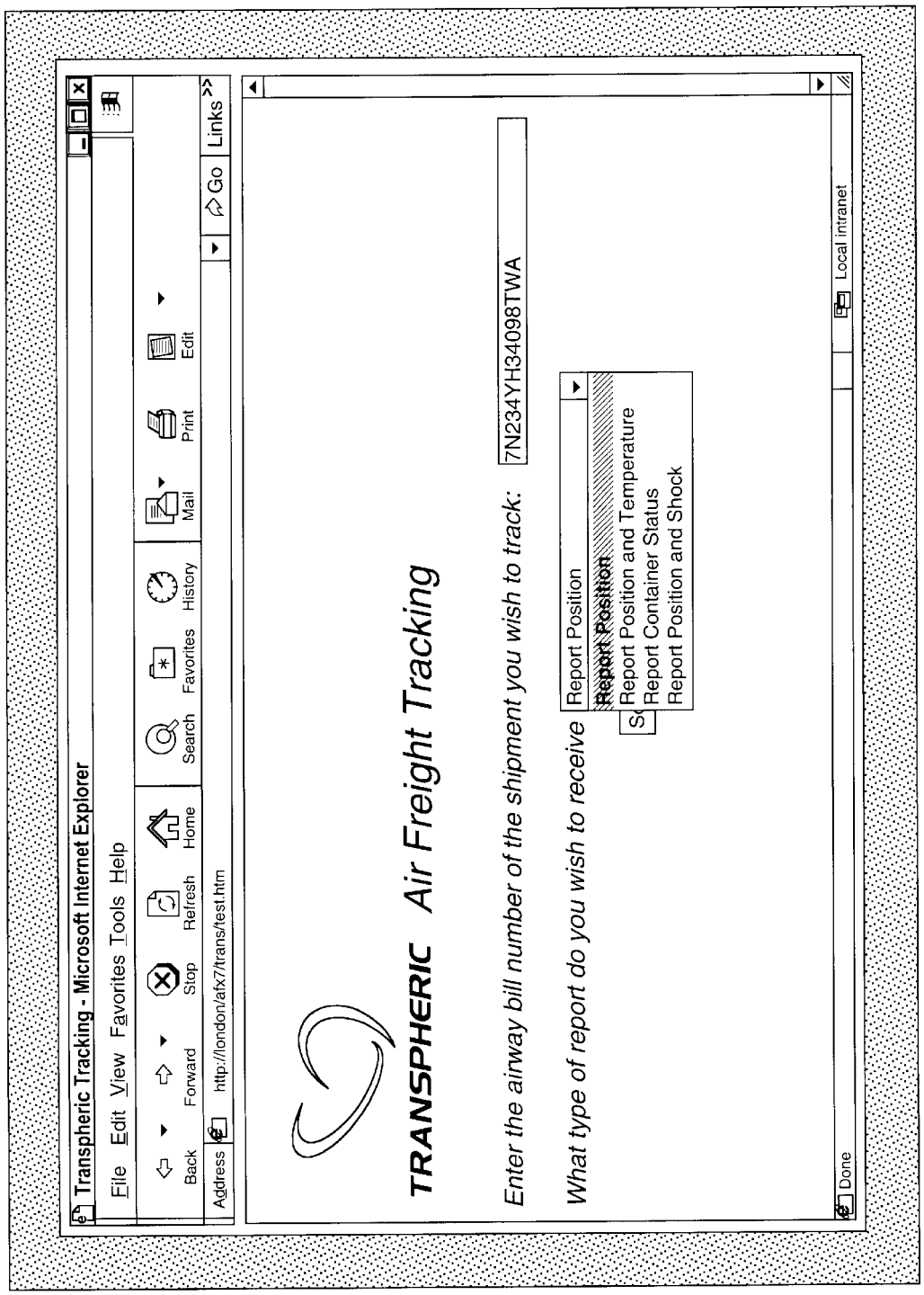
FIG. 6 illustrates an example of an Internet user interface designed for polling the system for container location and status information utilizing the air-way bill number as a container/PSC identifier.

The container is then shipped, preferably by truck, to the airport. (Step 513) At anytime during transit, the user can determine the location of the container by querying the system. (Step 515) The query is sent via the system's Web site, identifying the container in question using the PSC/transaction code, the air-way bill, or other unique identifier. FIG. 6 provides an example of an Internet user interface designed for polling the system for container location and status information utilizing the air-way bill number as a container/PSC identifier. It is understood that in some embodiments of the invention, additional user validation such as a user-defined password may be required to insure shipment confidentiality/security.

Figure 7:
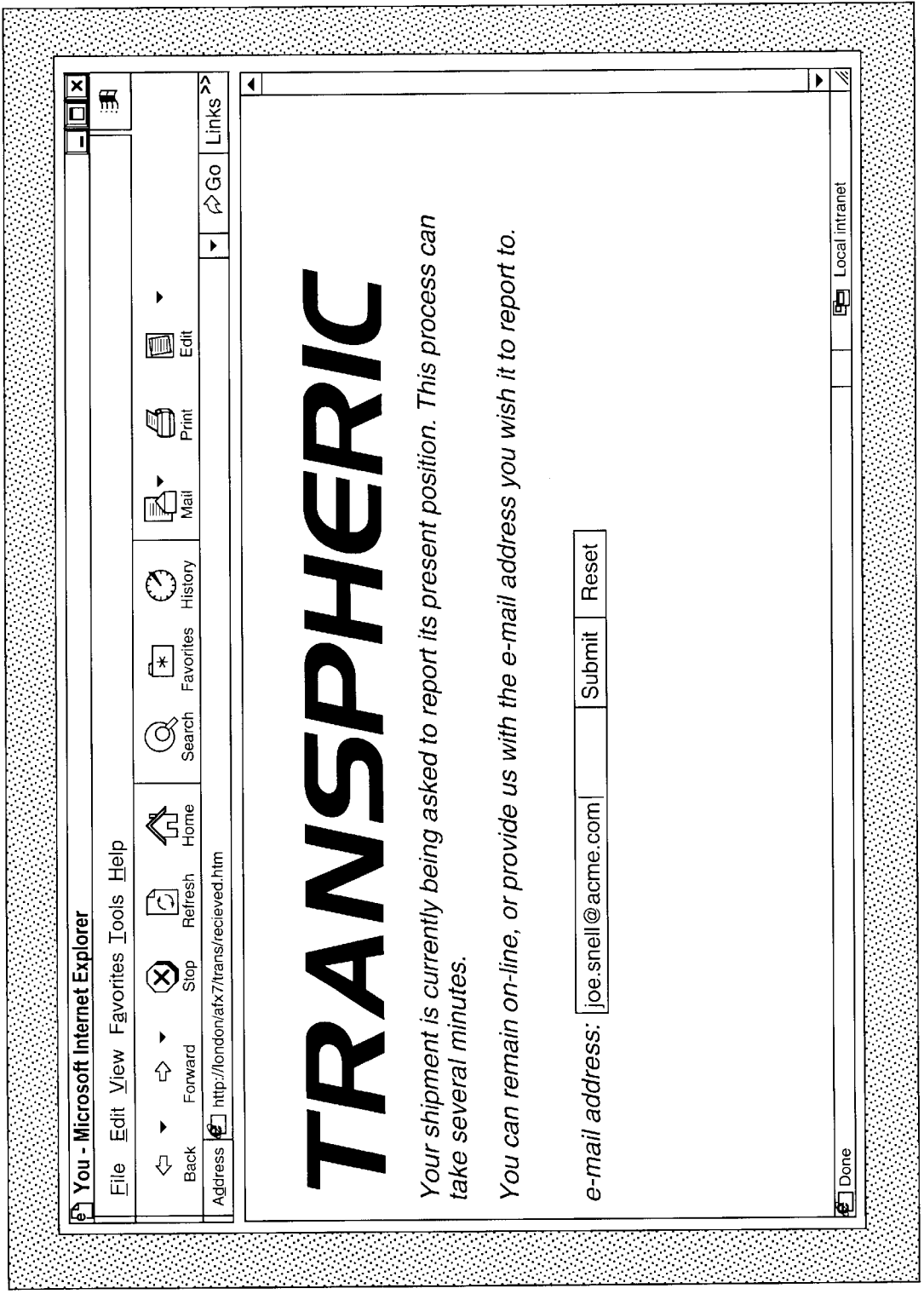
FIG. 7 illustrates an example of an Internet user interface that provides the user with status information during container location determination.

The user's request for container location is sent via the Internet to the ground-based tracking system. (Step 517) As shown in FIG. 7, preferably while the container's location is being determined, the Internet user interface provides the user with status information as well as an option for having the container location, once determined, e-mailed to them. After receipt of the user's request, the ground system queries the container/PSC unit via the communication satellite constellation. (Step 519) Once the container/PSC unit receives the query, it determines its location using a GPS system (step 521) and sends this information back to the ground system via the communication satellite constellation (step 523). The ground system converts the numerical position data (i.e., latitude and longitude) into a location description (e.g., Gate 7 of O'Hare Airport) (step 525) and sends the converted data to the user via the Internet (step 527). The container location can also be provided to the user as a location on a map, the map being presented to the user over the Web site.

Alternately, a ground system data base is continually updated with respect to the location of the container/PSC unit. (Step 529) Updates can be obtained by the ground system periodically polling the container/PSC unit; the container/PSC unit periodically sending its position (unrequested) to the ground system; or the container/PSC unit sending its position to the ground system whenever it registers a change in location. In this embodiment when the user queries the Web site to determine the location of the container (step 515), the location information which has already been updated is immediately provided to the user (step 527).

When the container/PSC unit undergoes a change of elevation (step 530) it transmits a message to the ground system, the message including both elevation change information as well as location information (step 531). Based on this information, the system determines whether or not the container has been loaded into an airplane. (Step 533) This determination is based, at least in part, on the elevation change information, i.e., whether or not the change in elevation is sufficient to indicate loading into an airplane. The system also relies on the location data to minimize errors. For example, even if the elevation change information indicates that the container has been loaded into an aircraft, if the location information indicates that the container is not at an airport, the data is disregarded and reported/stored as a non-loading event.

Once the system determines that the container has been loaded into an airplane (step 535), the system determines flight information based on container location and flight data, and forwards the information to the user via e-mail, automated fax, automated phone, or other means. (Step 537) Alternately, the system can store this information (step 539), providing it whenever requested by the user.

As the container/PSC unit is unloaded from the plane (step 541), a change of elevation is sensed (step 543). A container unloading event is distinguished from an elevation change that occurs during flight by both the rate of change and the pattern of change. Once an unloading event is recognized, the container/PSC unit contacts the ground system (step 545), providing the system with location data (step 547). The ground system converts the numerical position data into a location description and/or map (step 549) and sends the converted data to the user via e-mail, automated fax, automated phone, or other means (step 551). Alternately, the system can store this information (step 553), providing it whenever requested by the user.

The container is then retrieved by the user, for example using a previously scheduled trucking service. (Step 555) The payload is then removed from the container (step 557) and the container and/or PSC unit returned for reuse (step 559).

System Components

As previously disclosed, the invention is comprised of several subsystems. Each of these subsystems is described in further detail below.

Satellite Constellation(s)

As previously noted, satellites are used for two purposes in the present invention. First, they provide a means of communicating with the PSC unit. Second, they provide a means of determining location, typically by computing the Doppler shift of a satellite's downlink signal. Each of these technologies is well known by those of skill in the art, and currently used in a variety of fields. Accordingly, detailed descriptions are not provided herein. It will be understood and appreciated that the extent of required global coverage will be determined by the intended use of the invention. For example, if the system is only to be used within the continental United States, coverage can be correspondingly limited. In the preferred embodiment, however, coverage extends throughout the world, thus allowing the invention to be used anywhere. Additionally, it will be understood and appreciated that the present invention can utilize two satellite systems, one dedicated to GPS and the other dedicated to communication, or the two systems can be combined as in the preferred embodiment. Lastly, it will be understood that although communications preferably utilize one or more satellite constellations, other communication techniques can be used that utilize infrared communication links, ground-based wireless systems, or other systems providing equivalent capabilities.

Ground System

The ground system (e.g., system 109 in FIG. 1 and system 304 in FIG. 3) serves multiple purposes. First, it coordinates all user requests and all communications with containers/PSC units. Second, it communicates with all secondary parties (e.g., airlines, trucking companies, etc.). Third, it translates location coordinates (e.g., latitude and longitude) into user recognizable locations (e.g., a description of a location or a map with a container location indicator). Fourth, it can be used for data verification purposes, for example, requesting that a container/PSC unit resend its location if the initially sent location appears incorrect (e.g., the container, which is currently in transit via a truck, indicates a water location). Fifth, it can be used to reduce the data received from a PSC unit, for example determining the change in container elevation based on measured and reported container acceleration and corresponding acceleration time, steady state velocity and corresponding time, and deceleration and corresponding deceleration time. Sixth, it can be used to discriminate between various events. For example, during transit a container may undergo many elevational changes. By calculating the exact change in elevation and monitoring both the rate of acceleration and deceleration associated with the change in elevation, the ground system can determine when a change in elevation indicates that the container is being loaded or unloaded from an airplane. Seventh, the ground system can be used to monitor the status of a container and react as required when the container is placed in an undesirable environment (e.g., outside of the desired temperature or humidity range, exceeding the desired vibrational levels, etc.). Eighth, it manages the system data which may include, among other data, (i) container use logs that indicate the number of times a particular container has been used, (ii) container location logs that maintain the last reported location of each container/PSC unit, and (iii) a geographic data base that provides accurate location information and location descriptions (e.g., gate information for a particular airport) based on latitude and longitude coordinates.

User Interface

In the preferred embodiment of the invention, the user interface is a Web site that can be accessed via any personal computer with Internet access. Alternately, the invention can utilize one or more ground terminals in communication with the ground system. For example, the ground terminals could be assessable at multiple locations (e.g., at all primary airport terminals) by all users, only by registered users, or only by system personnel.

The primary form of system communication in the preferred embodiment of the invention is through a Web site. Examples of suitable Web pages are provided in FIGS. 6 and 7. The preferred Web pages provide a means for the user to input container/PSC identification codes (e.g., air-way bills), request specific information (e.g., cargo location), and receive requested information.

In addition to communication via a Web site, communication between a user and the ground system can also utilize other communication links as briefly outlined below.

E-Mail—The system can be designed to accommodate user requests and information exchanges via e-mail. Typically the user is required to follow a pre-defined, system recognizable format. For example, the user may be required to include the PSC identifier in the subject line and limit the text of the message to "status?". The ground system, recognizing both the PSC identifier and the request, queries the container in question and e-mails back the location, using a pre-defined format (e.g., airport code, city, state).

Automated Fax—This communication technique is primarily of use in one-way communication from the ground system to the user's previously registered fax. For example, the system can be configured to send a fax providing the location of the container in question whenever it is queried by the user, the fax being automatically prepared and electronically processed without human interaction.

Voice Recognition and Voice Synthesizer System—The ground system can utilize both a voice recognition system and a voice synthesis system to communicate with the user. In this instance the user would call the ground system and supply the requested PSC identification code. Once recognized, the system would provide the requested status information. This system can be augmented with a keypad tone recognition system in which certain data (e.g., user identification, PSC identification, etc.) is supplied using the touch pad of a tone generating telephone or other tone generation means.

Voice Synthesizer only—In this configuration the ground system would not include a voice recognition system, but would include a voice synthesizer. Accordingly the ground system could notify the user via telephone of container location, status or related information.

PSC Unit

The PSC unit has two primary functions: first, to provide a means of communicating with the ground system and second, to provide a means of identifying the location of the container to which it is attached.

Figure 8:
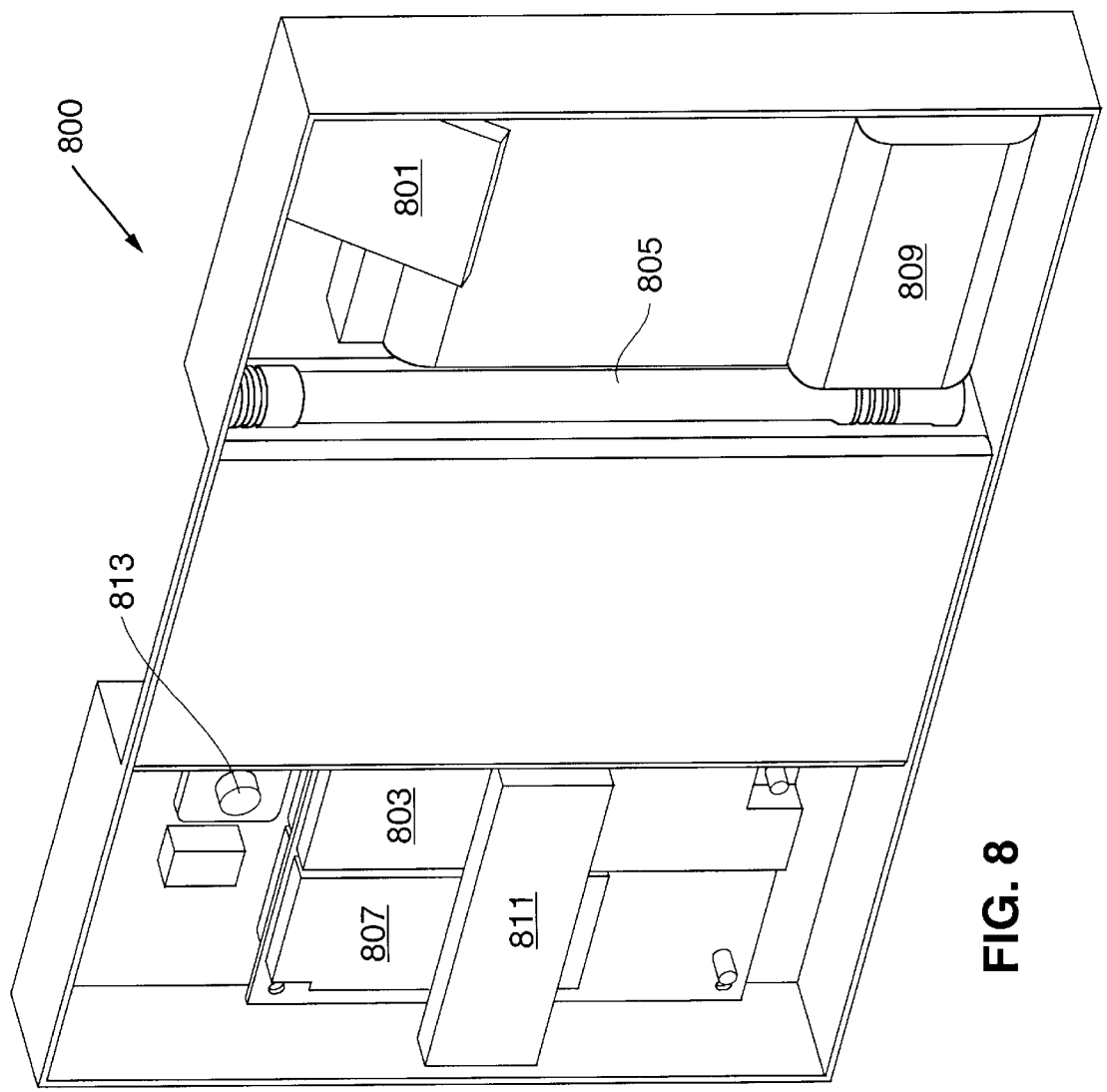
FIG. 8 is an illustration of the preferred embodiment of a PSC unit.

FIG. 8 is an illustration of the preferred embodiment of a PSC unit 800. PSC unit 800 includes a GPS antenna 801 and GPS electronics 803, a radio communications antenna 805 and transceiver electronics 807 typically operating in the VHF frequency range, and a power supply 809. In at least one embodiment, GPS electronics 803 and/or transceiver electronics 807 include solid-state memory for storing data, identification codes, instructions, etc. Preferably power supply 809 is a rechargeable and removable battery pack and unit 800 is Gel packed, thereby further protecting the enclosed electronics and antenna assemblies.

Preferably a display 811 is included within unit 800, the display providing a means of obtaining unit configuration and/or calibration data as well as system status. Additionally, display 811 can be used to display the transaction identification code (e.g., an air-way bill number). In at least one embodiment of the invention, display 811 provides an alternate identifier such as a bar code that can be read by a courier service and can be remotely modified by the ground system via the communication system. This identifier (e.g., a bar code) can be used to route the PSC unit, for example to route the unit to a central storage facility or to the next user.

In addition to the primary functionality of the PSC unit, preferably it is designed to provide additional, or secondary, functionality as well. For example, the PSC unit can include additional sensors that allow it to provide the user with environmental conditions, container status, rate and/or direction of movement, etc. As previously described, the information obtained from these sensors can be provided only upon request, or it can be sent automatically, typically upon the occurrence of a previously specified condition (e.g., the temperature of the container exceeding a preset temperature or falling below a preset temperature). Sensed information can also be stored within the memory of the PSC unit, downloadable and readable at a later time, thereby providing the user or other party with a log of the environment that the container has been exposed to during transit. Preferably the sensor package (e.g., module 813 of PSC unit 800) includes sensors for detecting temperature, humidity, vibration, and the rate and direction of motion (for example, using one or more accelerometers). Additional sensors can also be included, for example to determine whether a container door is in an opened or closed position.

Figure 9:
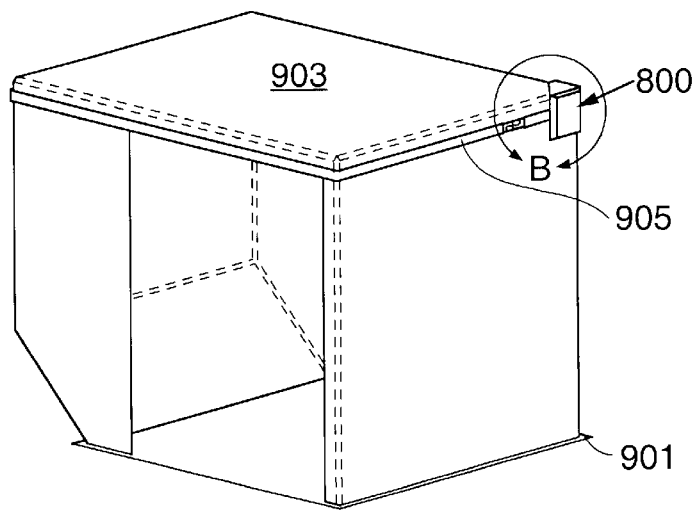
FIG. 9 is an illustration of a PSC unit attached to the corner of a shipping container or ULD.

In at least one embodiment of the invention, the housing for the PSC unit is capable of being folded/unfolded. When folded or closed, the unit forms a small flat package that can be easily transported, for example using a standard overnight shipping envelope. Preferably when closed, the unit automatically turns off, thus conserving power. Similarly, when opened, the unit automatically powers up. When unfolded or open, the unit forms a 90 degree angle, thus allowing the unit to be placed over an edge, top or side, of a container box and optimally positioning the unit's antennae and sensor electronics. If the intended container is non-metallic, the PSC unit can also be mounted with the same orientation to the inside of the container. Preferably the PSC unit is attached close to a corner of a container as shown in FIG. 9, rather than in the middle of a flat edge, thus providing a wider field of view for the unit's antennae (e.g., on the order of 270 degrees).

In order to facilitate PSC unit mounting while minimizing impact on container shipping, the PSC unit is preferably designed to have a thickness less than that of lip 901 which extends outwardly along the periphery of standard airline cargo unit load device or ULD 903. The claw like locking system of a standard container loader uses this lip which extends between 1.4 and 1.75 inches away from the base of container 903. The volume extending above the claw clearance area to just slightly above the container is typically unused. Accordingly, PSC unit 800 is mounted within this volume, thus insuring that it does not interfere with the loader, the aircraft, or other containers/objects. Additionally, since air cargo containers cannot be stacked when full, there is minimal chance of damaging the mounted PSC unit.

PSC unit 800 can be mounted to container 903 using any of a variety of techniques. For example, a disposable or non-disposable pouch can be attached to container 903 using tape, adhesives, suction cups, or other methods, the PSC unit fitting within the pouch during use. Alternately, either the PSC unit or a PSC unit holding pouch can be strapped to the container with an air cargo tie-down strap 905 as shown in FIG. 9. Alternately, either the PSC unit or a PSC unit holding pouch can be clipped to the container edge trim or door opening of the container. Alternately, a cradle housing the PSC unit can be attached to the container. Alternately, the PSC unit can be fitted to a cargo net covering some of or all of the container. Alternately, the PSC unit can be attached to the container pallet.

As previously disclosed, an accelerometer sensor package is preferably included in sensor module 813, the accelerometer sensor package supplying acceleration and deceleration information to either an on-board data processor that is included in the sensor module, or to the ground system, for data conversion. Using this data, either the on-board processor or the ground system can determine the vibration and handling environment of the container in general, and more particularly whether the container is being loaded or unloaded from the aircraft.

To determine if a container is being loaded or unloaded using an on-board accelerometer sensor package, the rate of container movement and direction of container movement is monitored. Using this information in conjunction with time, container elevation changes are determined. All of this information can then be used to determine if a container is being loaded/unloaded into an aircraft versus simply being moved (e.g., on/off a truck, within a warehouse, etc.). Several factors facilitate this determination. First, a container must be raised over five feet in order to be loaded into the hold of an aircraft. For example, modern freight aircraft require a 12 foot lift. Second, cargo loaders are required to move at relatively slow rates during the loading/unloading process to minimize the chances of aircraft damage. Typically during aircraft loading/unloading, the rate of vertical container movement is between 0.3 and 0.5 feet per second. Once the container is in position for loading, it is rolled into the aircraft at a rate of 2 feet per second. Third, due to size and logistical requirements, loading/unloading is always performed outdoors thus providing a minimum 20 second window with a clear view to space during loading/unloading.

Figure 10:
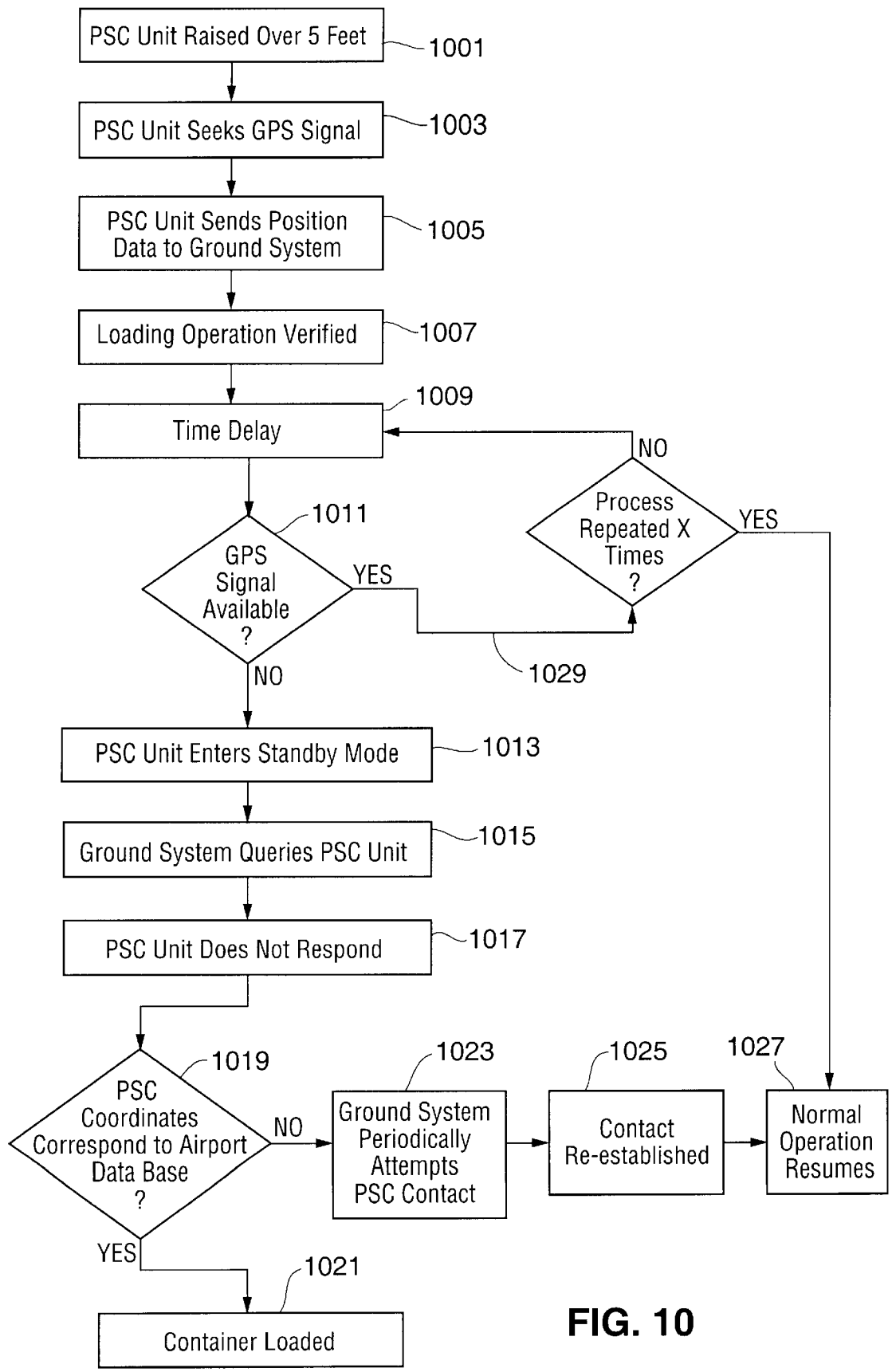
FIG. 10 illustrates a process by which aircraft loading is determined using the preferred embodiment of the invention.

FIG. 10 illustrates one process by which aircraft loading is determined using the preferred embodiment of the invention. Whenever the PSC unit is raised over five feet (step 1001), as determined by the on-board accelerometer sensor package, it seeks a GPS signal (step 1003) and sends its coordinates to the ground system (step 1005). Preferably either the on-board processor or the ground system also verifies that the PSC unit has been loaded into an aircraft, preferably by finding a correspondence between the rate of container movement in both the vertical and horizontal axes and the rates required of a cargo loader. (Step 1007)

After a time delay of approximately 1 to 2 minutes (step 1009), the PSC unit determines if a GPS signal can still be received (step 1011). If no signal is received, the PSC unit goes into standby mode. (Step 1013) In the standby mode the satellite communication portions of the PSC unit are shut down, thus insuring that the unit does not produce emissions that could interfere or otherwise prove harmful to the aircraft's avionics systems (e.g., communication systems, navigation systems, etc.). If the ground system does not receive further communication from the PSC unit within a predetermined time, e.g., 10 minutes, it queries the PSC unit to determine if it is still functioning and capable of receiving and sending data. (Step 1015) If the PSC unit does not respond (step 1017) the ground system compares the last received container coordinates with an airport data base (step 1019). If the container coordinates correspond to an airport, and more preferably to a loading terminal at an airport, the system concludes that the container has been loaded into an aircraft (step 1021) and awaits further communications from the PSC unit. If the container coordinates do not correspond to an airport, the ground system continues to periodically attempt to communicate with the PSC unit (step 1023) until contact is re-established (step 1025). At this point normal system operations are resumed. (Step 1027)

At step 1011, if a signal is received (step 1029), the PSC unit repeats the steps of waiting for a predetermined period of time, approximately 1 to 2 minutes (step 1009), and attempting to obtain a GPS signal. This process is repeated several times, typically between 3 and 5 times. After the process has been repeated the preset number of times (step 1031), each time determining that a GPS signal is available, normal operation is resumed (step 1027).

Figure 11:
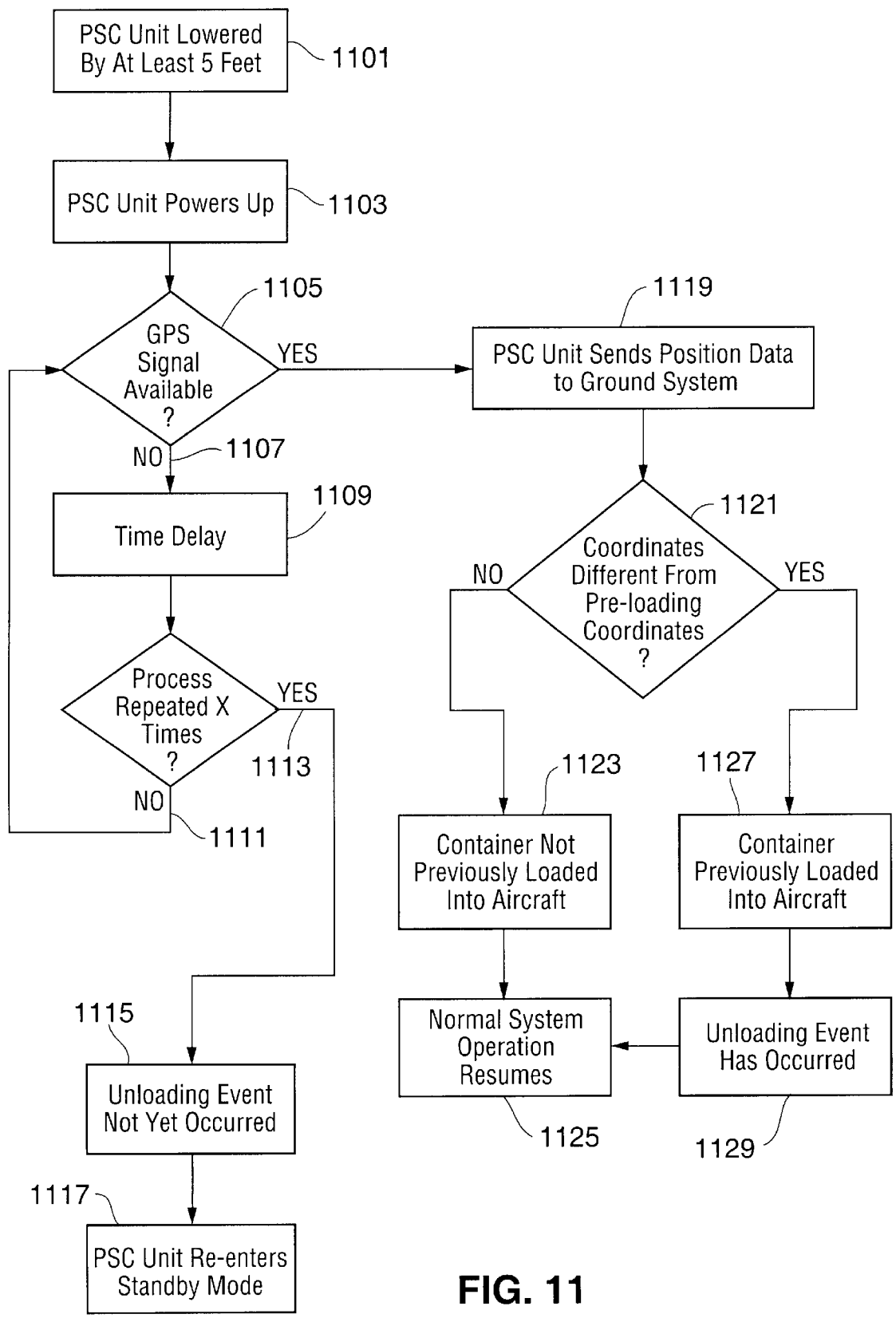
FIG. 11 illustrates a process by which aircraft unloading is determined using the preferred embodiment of the invention.

FIG. 11 illustrates one process by which container unloading is determined using the preferred embodiment of the invention. Whenever the PSC unit is lowered by at least five feet (step 1101), as determined by the on-board accelerometer sensor package, the entire PSC unit is powered up (step 1103) and the unit attempts to obtain a GPS signal (step 1105). If no signal is obtained (step 1107), the unit waits for a predetermined period of time, typically 1 and 2 minutes (step 1109), and then re-attempts to obtain a GPS signal (step 1111). If no signal is obtained after repeating this process a preset number of times (step 1113), the unit concludes that the container was not unloaded (step 1115) and the unit re-enters the standby mode.

If the PSC unit obtains a GPS signal at step 1105, position coordinates are sent to the ground system. (Step 1119) The ground system or the PSC unit then compares the current position coordinates to those obtained during container loading. (Step 1121) If the two sets of coordinates are unchanged, the system concludes that either the container was not previously loaded or the container is being unloaded prior to transit, perhaps due to an aircraft malfunction (step 1123) and the system resumes normal operation (step 1125). If the two sets of coordinates are different, the system concludes that the container had previously been loaded into an aircraft (step 1127) and that a container unloading event has occurred (step 1129). Normal operation then resumes. (Step 1125).

Although the preferred embodiment of the invention monitors changes in container elevation as well as the rate of change to determine aircraft loading and unloading, it is understood that other sensors can be used to determine these events without departing from the invention. These sensors can either replace or be used in conjunction with the previously described sensors. By using these sensors in conjunction with the previously described sensors, redundancy is built into the system. In addition to redundancy, multiple sensor packages allow loading and unloading events to be determined with a greater degree of confidence. Once it is determined that the PSC unit and the associated container have been loaded into the plane's cargo bay, the PSC unit enters into a standby mode. Once the unit enters into the standby mode, the PSC unit continues to sample its environment, preferably at intervals of between 3 and 5 minutes, to determine when the unit has been unloaded and can therefore resume normal communications with the satellite(s) system.

Sensors can utilize any of a variety of aircraft characteristics to determine when the container has been loaded within the plane's cargo bay. In one embodiment, the sensor monitors the electromagnetic spectrum of its surroundings. Since the radiated emissions from the aircraft power supply are most prevalent at 400 Hertz, monitoring the electromagnetic spectrum at this frequency provides one method of detecting container loading. As the power harness for most aircraft is routed through the floor, this type of detector works best when located near the top of the container or ULD, thus insuring close proximity between the detector and the source. In an alternate embodiment, the PSC unit includes a RF detector designed to detect non-aircraft originating RF signals (e.g., non-400 Hertz frequencies). Since the conductive and continuous nature of the aircraft skin blocks the receipt of normally occurring RF energy, aircraft loading is accompanied by the elimination or dramatic decrease in such RF energy. In another alternate embodiment, the PSC unit's sensor module emits one or more pulses of radiation, preferably ultrasonic radiation, and monitors the return of the radiation. The timing of the return can be used to detect the proximity of adjacent surfaces, such as the walls of the aircraft. In order to avoid detecting adjacent containers, preferably the PSC unit is mounted near the top of the container or the ULD and the sensor module emits radiation only in an upward direction.

As will be understood by those familiar with the art, the present invention may be embodied in other specific forms without departing from the spirit or essential characteristics thereof. For example, the invention is not limited to those types of PSC sensor modules specifically disclosed. Accordingly, the disclosures and descriptions herein are intended to be illustrative, but not limiting, of the scope of the invention which is set forth in the following claims.

What is claimed is:

1. A method of providing container status information to a user, the method comprising of the steps of:

attaching an electronic communications unit to a shipping container;

generating a transaction identification code, wherein said transaction identification code is specific to said shipping container and specific to at least one user transaction;

initiating a status inquiry utilizing said transaction identification code, wherein said user performs said initiating step;

receiving said status inquiry by a ground communications system;

transmitting said status inquiry to said electronic communications unit by said ground communications system;

obtaining a status information response by said electronic communications unit;

transmitting said status information response to said ground communications system by said electronic communications unit; and forwarding said status information response to said user by said ground communications system.

2. The method of claim 1, wherein said status inquiry is a positional status inquiry.

3. The method of claim 2, said step of obtaining said status information response further comprising the step of obtaining a set of shipping container position coordinates by said electronic communications unit.

4. The method of claim 3, said step of obtaining said set of shipping container position coordinates further comprising the step of querying a GPS satellite system by said electronic communications unit.

5. The method of claim 3, further comprising the step of translating said set of shipping container position coordinates to a shipping container location description by said electronic communications system, wherein said shipping container location description is transmitted to said ground communications system as said status information response.

6. The method of claim 3, further comprising the step of translating said set of position coordinates to a shipping container location description by said ground communications system, wherein said set of position coordinates are transmitted to said ground communications system by said electronic communications system as said status information response and said location description is forwarded to said user by said ground communications system as a translated status information response.

7. The method of claim 1, wherein said status inquiry is an environmental status inquiry.

8. The method of claim 7, said step of obtaining said status information response further comprising the step of interrogating a sensor module coupled to said electronic communications unit to obtain an environmental status response, said environmental status response transmitted to said ground communications system as said status information response.

9. The method of claim 1, wherein said status inquiry is a shipping container status inquiry.

10. The method of claim 9, said step of obtaining said status information response further comprising the step of interrogating a sensor module coupled to said electronic communications unit to obtain a shipping container status response, said shipping container status response transmitted to said ground communications system as said status information response.

11. The method of claim 1, wherein said step of transmitting said status inquiry to said electronic communications unit by said ground communications system utilizes a satellite communications system.

12. The method of claim 1, wherein said shipping container is selected from the group of shipping containers consisting of cargo containers, pallets, cargo nets, and cargo unit load devices.

13. The method of claim 1, wherein said step of attaching said electronic communications unit to said shipping container is further comprised of the step of inserting said electronic communications unit into a pouch, said pouch affixed to said shipping container.

14. The method of claim 13, wherein said pouch is affixed to said shipping container with tape, adhesive, suction cups, or straps.

15. The method of claim 1, wherein said transaction identification code is an air-way bill.

16. The method of claim 1, said status inquiry initiating step further comprising the step of linking to said ground communications system via an Internet Web site.

17. The method of claim 1, said status inquiry initiating step further comprising the step of transmitting said status inquiry to said ground communications system via an e-mail system.

18. The method of claim 1, further comprising the steps of:
   obtaining a status information summary by said electronic communications unit; and
   storing said status information summary within a memory module coupled to said electronic communications unit, wherein said step of obtaining said status information response is performed by polling said memory module for a current status information summary.

19. The method of claim 18, wherein said step of obtaining said status information summary is periodically performed.

20. The method of claim 18, further comprising the step of continually monitoring a status indicator, wherein said step of obtaining said status information summary is performed in response to a monitored change in said status indicator.

21. The method of claim 20, wherein said monitored status indicator corresponds to a shipping container location.

22. The method of claim 20, wherein said monitored status indicator corresponds to an environmental condition.

23. The method of claim 1, wherein said status information response is forwarded to said user via an Internet Web site.

24. The method of claim 1, said status information response forwarding step further comprising the step of transmitting said status information response to said user via an e-mail system.

25. The method of claim 1, said status information response forwarding step further comprising the step of transmitting said status information response to said user via an automated facsimile system.

26. The method of claim 1, said status information response forwarding step further comprising the step of transmitting said status information response to said user via a telephone system and a voice synthesized message.

27. The method of claim 1, further comprising the steps of:
   monitoring at least one shipping container status indicator with said electronic communications unit;
   updating shipping container status information in response to a change in said at least one monitored shipping container status indicator;
   transmitting said updated shipping container status information to said ground communications system by said electronic communications unit; and
   forwarding said updated shipping container status information to said user by said ground communications system.

28. The method of claim 1, further comprising the steps of:
   monitoring at least one shipping container status indicator with said electronic communications unit;
   obtaining a set of shipping container position coordinates in response to a change in said at least one monitored shipping container status indicator;
   transmitting said set of shipping container position coordinates to said ground communications system by said electronic communications unit; and
   forwarding said set of shipping container position coordinates to said user by said ground communications system.

29. The method of claim 1, further comprising the steps of:
   detecting an airplane loading event;
   placing a portion of said electronics communications unit into standby mode in response to said detected airplane loading event;
   detecting an airplane unloading event; and
   re-activating said portion of said electronics communications unit in response to said detected airplane unloading event.

30. A method of providing container status information to a user, the method comprising of the steps of:
   attaching an electronic communications unit to a shipping container;
   generating a transaction identification code, wherein said transaction identification code is specific to said shipping container and specific to at least one user transaction;
   monitoring at least one shipping container status indicator with said electronic communications unit;

updating shipping container status information in response to a change in said at least one monitored shipping container status indicator;

transmitting said updated shipping container status information to a ground communications system by said electronic communications unit; and forwarding said updated shipping container status information to said user by said ground communications system.

31. The method of claim 30, further comprising the step of receiving a status inquiry from said user by said ground communications system, said status inquiry utilizing said transaction identification code, wherein said forwarding step is performed in response to said receiving step.

32. The method of claim 30, wherein said shipping container status indicator is a shipping container location.

33. The method of claim 30, said step of updating shipping container status information further comprising the step of obtaining a set of shipping container position coordinates by said electronic communications unit.

34. The method of claim 33, said step of obtaining said set of shipping container position coordinates further comprising the step of querying a GPS satellite system by said electronic communications unit.

35. The method of claim 33, further comprising the step of translating said set of shipping container position coordinates to a shipping container location description by said electronic communications system, wherein said shipping container location description is transmitted to said ground communications system as said updated shipping container status information.

36. The method of claim 33, further comprising the step of translating said set of position coordinates to a shipping container location description by said ground communications system, wherein said set of position coordinates are transmitted to said ground communications system by said electronic communications system as said updated shipping container status information and said shipping container location description is forwarded to said user by said ground communications system as a translated shipping container status information.

37. The method of claim 30, wherein said at least one shipping container status indicator is an environmental status indicator.

38. The method of claim 30, wherein said step of transmitting said updated shipping container status information to said ground communications system by said electronics communications unit utilizes a satellite communications system.

39. The method of claim 30, wherein said shipping container is selected from the group of shipping containers consisting of cargo containers, pallets, cargo nets, and cargo unit load devices.

40. The method of claim 30, wherein said step of attaching said electronic communications unit to said shipping container is further comprised of the step of inserting said electronic communications unit into a pouch, said pouch affixed to said shipping container.

41. The method of claim 40, wherein said pouch is affixed to said shipping container with tape, adhesive, suction cups, or straps.

42. The method of claim 30, wherein said transaction identification code is an air-way bill.

43. The method of claim 31, said step of receiving said status inquiry from said user further comprising the step of linking to said ground communications system by said user via an Internet Web site.

44. The method of claim 31, said step of receiving said status inquiry from said user further comprising the step of transmitting said status inquiry to said ground communications system via an e-mail system.

45. The method of claim 30, further comprising the step of storing shipping container status information within a memory module coupled to said electronic communications unit.

46. The method of claim 30, wherein said updated shipping container status information is forwarded to said user via an Internet Web site.

47. The method of claim 30, said updated shipping container status information forwarding step further comprising the step of transmitting said updated shipping container status information to said user via an e-mail system.

48. The method of claim 30, said updated shipping container status information forwarding step further comprising the step of transmitting said updated shipping container status information to said user via an automated facsimile system.

49. The method of claim 30, said updated shipping container status information forwarding step further comprising the step of transmitting said updated shipping container status information to said user via a telephone system and a voice synthesized message.

50. The method of claim 30, further comprising the steps of:

detecting an airplane loading event;

placing a portion of said electronics communications unit into standby mode in response to said detected airplane loading event;

detecting an airplane unloading event; and re-activating said portion of said electronics communications unit in response to said detected airplane unloading event.

* * * * *